US009897317B2

(12) United States Patent
Stuttaford et al.

(10) Patent No.: US 9,897,317 B2
(45) Date of Patent: Feb. 20, 2018

(54) THERMALLY FREE LINER RETENTION MECHANISM

(71) Applicant: ANSALDO ENERGIA IP UK LIMITED, London (GB)

(72) Inventors: Peter John Stuttaford, Jupiter, FL (US); Stephen Jorgensen, Palm City, FL (US); Hany Rizkalla, Stuart, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 931 days.

(21) Appl. No.: 14/038,038

(22) Filed: Sep. 26, 2013

(65) Prior Publication Data

US 2015/0184856 A1 Jul. 2, 2015

Related U.S. Application Data

(60) Provisional application No. 61/708,323, filed on Oct. 1, 2012.

(51) Int. Cl.

| | |
|---|---|
| ***F02C 7/20*** | (2006.01) |
| ***F23R 3/00*** | (2006.01) |
| ***F23R 3/60*** | (2006.01) |
| ***B23K 1/00*** | (2006.01) |
| ***B23K 31/02*** | (2006.01) |

(52) U.S. Cl.

CPC ............ *F23R 3/002* (2013.01); *B23K 1/0008* (2013.01); *B23K 31/02* (2013.01); *F23R 3/60* (2013.01); *F23R 2900/00017* (2013.01); *F23R 2900/00018* (2013.01); *Y10T 29/49826* (2015.01)

(58) Field of Classification Search

CPC .. F23R 3/002; F23R 3/60; F23R 2900/00017; F23R 2900/00018; F02C 7/20

See application file for complete search history.

(56) References Cited

U.S. PATENT DOCUMENTS

| | | | |
|---|---|---|---|
| 2,457,157 A | 12/1948 | King, Jr. | |
| 3,759,038 A * | 9/1973 | Scalzo | F01D 9/023 415/117 |
| 4,292,810 A | 10/1981 | Glenn | |

(Continued)

FOREIGN PATENT DOCUMENTS

| | | |
|---|---|---|
| EP | 0747635 | 12/1996 |
| JP | S55-102836 | 8/1980 |

(Continued)

OTHER PUBLICATIONS

PCT Application No. US2013/062693, Search Report dated Mar. 14, 2014, 11 pages.

(Continued)

*Primary Examiner* — Arun Goyal
(74) *Attorney, Agent, or Firm* — Hovey Williams LLP

(57) ABSTRACT

The present invention discloses a novel and improved device and method for securing a combustion liner within a gas turbine combustor. The improved configuration comprises a plurality of equally spaced support tab assemblies secured about the combustion liner and positioned radially outward of the combustion zone. The support tab assemblies comprise parallel liner tabs which provide increased flexibility, greater structural support, and lower operating stresses.

17 Claims, 10 Drawing Sheets

(56) References Cited

U.S. PATENT DOCUMENTS 4,735,052 A 4/1988 Maeda et al.
4,910,957 A 3/1990 Moreno et al.
4,928,481 A 5/1990 Joshi et al.
5,121,597 A 6/1992 Urushidani et al.
5,129,226 A 7/1992 Bigelow et al.
5,319,935 A 6/1994 Toon et al.
5,363,643 A * 11/1994 Halila .................... F23R 3/002 60/752
5,452,574 A 9/1995 Cowell et al.
5,584,684 A 12/1996 Dobbeling et al.
5,676,538 A 10/1997 Lovett
5,802,854 A 9/1998 Maeda et al.
5,983,642 A 11/1999 Parker
6,056,538 A 5/2000 Buchner et al.
6,094,916 A 8/2000 Puri et al.
6,513,334 B2 2/2003 Varney
6,558,154 B2 5/2003 Eroglu et al.
6,634,175 B1 10/2003 Kawata et al.
6,935,116 B2 8/2005 Stuttaford et al.
6,938,424 B2 * 9/2005 Tiemann .................. F23M 5/02 60/752
6,986,254 B2 1/2006 Stuttaford et al.
7,093,445 B2 8/2006 Corr, II et al.
7,137,256 B1 11/2006 Stuttaford et al.
7,237,384 B2 7/2007 Stuttaford et al.
7,308,793 B2 12/2007 Oumejjoud et al.
7,373,778 B2 * 5/2008 Bunker ................... F01D 25/12 431/351
7,513,115 B2 4/2009 Stuttaford
7,540,152 B2 6/2009 Tanimura et al.
7,677,025 B2 3/2010 Stuttaford et al.
7,770,395 B2 8/2010 Tanimura et al.
7,886,545 B2 2/2011 Lacy et al.
8,448,444 B2 * 5/2013 Cihlar .................... F01D 9/023 60/772
8,646,277 B2 * 2/2014 Chila ........................ F02K 1/82 60/752
8,656,721 B2 2/2014 Matsumoto et al.
9,182,122 B2 * 11/2015 Matthews ............... F23R 3/005
2004/0006993 A1 1/2004 Stuttaford et al.
2006/0168965 A1 8/2006 Green et al.
2006/0168966 A1 8/2006 Stuttaford et al.
2007/0089419 A1 4/2007 Matsumoto et al.
2008/0083224 A1 4/2008 Varatharajan et al.
2009/0044540 A1 2/2009 Pangle et al.
2009/0111063 A1 4/2009 Boardman
2010/0319349 A1 12/2010 Rajaram et al.
2010/0319350 A1 12/2010 Landry et al.
2010/0326079 A1 12/2010 Zuo et al.
2011/0016867 A1 1/2011 Milosavljevic
2011/0067402 A1 3/2011 Wiebe et al.
2011/0094233 A1 4/2011 Kashihara et al.
2011/0113784 A1 5/2011 Headland et al.
2011/0185703 A1 8/2011 Dodo et al.
2011/0296839 A1 12/2011 Van Nieuwenhuizen et al.
2012/0045725 A1 2/2012 Takiguchi et al.
2012/0047897 A1 3/2012 Hirata et al.
2012/0186256 A1 7/2012 Dai et al.
2014/0090389 A1 4/2014 Stuttaford et al.
2014/0090390 A1 4/2014 Stuttaford et al.
2014/0090396 A1 4/2014 Stuttaford et al.
2014/0090400 A1 4/2014 Stuttaford et al.
2015/0075172 A1 3/2015 Stuttaford et al.
2015/0184858 A1 7/2015 Stuttaford et al.

FOREIGN PATENT DOCUMENTS

JP 2009-47409 A 3/2009
WO 9906767 A1 2/1999

OTHER PUBLICATIONS

PCT Application No. US2013/062668, Search Report dated Mar. 24, 2014, 60 pages.

PCT Application No. US2013/062688, Search Report dated Mar. 24, 2014, 17 pages.

PCT Application No. US2013/062673 Search Report and Written Opinion dated Apr. 11, 2014.

Non-Final Office Action dated Sep. 23, 2015 in U.S. Appl. No. 14/038,016, 20 pages.

International Search Report with Written Opinion mailed Jun. 27, 2014 in PCT Application No. PCT/US2013/062678, 11 pages.

U.S. Appl. No. 14/038,016, filed Sep. 26, 2013, 69 pages.

U.S. Appl. No. 14/038,029, filed Sep. 26, 2013, 64 pages.

U.S. Appl. No. 14/038,064, filed Sep. 26, 2013, 56 pages.

U.S. Appl. No. 14/038,056, filed Sep. 26, 2013, 51 pages.

U.S. Appl. No. 14/038,070, filed Sep. 26, 2013, 74 pages.

Notice of Allowance dated Jan. 20, 2016 in U.S. Appl. No. 14/038,016, 9 pages.

Non-Final Office Action dated Mar. 24, 2016 in U.S. Appl. No. 14/038,070, 20 pages.

Non-Final Office Action dated Mar. 25, 2016 in U.S. Appl. No. 14/038,064, 14 pages.

Non-Final Office Action dated May 2, 2016 in U.S. Appl. No. 14/038,056, 10 pages.

Non-Final Office Action dated May 16, 2016 in U.S. Appl. No. 14/038,029, 14 pages.

Office Action from Corresponding Japanese Application No. 2015-535722 dated Jul. 10, 2017 (with English translation) (15 pages).

* cited by examiner

THERMALLY FREE LINER RETENTION MECHANISM

CROSS-REFERENCE TO RELATED APPLICATIONS

This application claims the benefit of U.S. Provisional Patent Application Ser. No. 61/708,323 filed on Oct. 1, 2012.

TECHNICAL FIELD

The present invention generally relates to a system and method for improving the mechanical and thermal stresses in a combustion liner mounting system. More specifically, improvements in a mounting system are provided that compensate for the mounting system being positioned adjacent the combustion zone.

BACKGROUND OF THE INVENTION

In an effort to reduce the amount of pollution emissions from gas-powered turbines, governmental agencies have enacted numerous regulations requiring reductions in the amount of oxides of nitrogen (NOx) and carbon monoxide (CO). Lower combustion emissions can often be attributed to a more efficient combustion process, with specific regard to fuel injector location and mixing effectiveness.

Early combustion systems utilized diffusion type nozzles, where fuel is mixed with air external to the fuel nozzle by diffusion, proximate the flame zone. Diffusion type nozzles produce high emissions due to the fact that the fuel and air burn stoichiometrically at high temperature to maintain adequate combustor stability and low combustion dynamics.

An enhancement in combustion technology is the utilization of premixing, such that the fuel and air mix prior to combustion to form a homogeneous mixture that burns at a lower temperature than a diffusion type flame and produces lower NOx emissions. Premixing can occur either internal to the fuel nozzle or external thereto, as long as it is upstream of the combustion zone. An example of a combustion liner used in a premixing combustor of the prior art is shown in FIG. 1. The combustion liner 100 is generally cylindrical in shape and includes an inlet end 102 and an opposing outlet end 104. A plurality of fuel nozzles (not shown) are positioned at the inlet end 102 for injecting fuel into the combustion liner 100 to mix with compressed air and form a fuel-air premixture. This premixture is then ignited and burns to form the hot combustion gases used to drive then engine's turbine and provide either thrust for propulsive power or mechanical energy for driving an electrical generator.

Combustion systems for a gas turbine engine can come in a variety of configurations. Generally, for the purpose of discussion, the gas turbine engine may include low emission combustors such as those disclosed herein and may be arranged in a can-annular configuration about the gas turbine engine. One type of gas turbine engine (e.g., heavy duty gas turbine engines) may be typically provided with, but not limited to, six to eighteen individual combustors, each of the combustors having a casing, flow sleeve, combustion liner, fuel nozzles and an end cover.

In order to regulate the amount of air provided to a low emissions combustor, a flow sleeve 110 is positioned around the combustion liner 100, as shown in partial cross section in FIG. 2. More specifically, the combustion liner 100 is located radially within a flow sleeve 110 while the flow sleeve 110 is located radially within a combustor casing 112. The flow sleeve 110 is secured in an axial position within the casing 112 by a forward flange 114 which is seated within a casing flange 116. However, like the flow sleeve 110, the combustion liner 100 also must be secured in the proper axial position such that the fuel nozzles and other mating hardware (not shown) are properly positioned within the gas turbine combustor.

Combustion systems of the prior art have attempted to position and secure the combustion liner 100 in place in a variety of manners. For example, with reference to FIGS. 1-3, a common technique of securing a combustion liner in a flow sleeve is for the liner to include a plurality of T-shaped tabs 118 which extend radially outward from the combustion liner 100 and are received within slots of corresponding flow sleeve pegs 120. However, as it can be seen in FIG. 3, this technique includes a thick T-shaped liner tab 118 secured to the outer wall of the combustion liner 100 and such a thick tab design results in high thermal and mechanical stresses due its geometry, the amount of load on each tab and welding techniques applied for the joint between the tab and the combustion liner. A similar T-shaped style liner tab 118 is shown on the outer surface of an alternate combustion liner in FIG. 4.

An alternate prior art design for securing a combustion liner in a flow sleeve is depicted in FIGS. 5 and 6. In FIG. 5, a combustion liner 500 of the prior art is shown in perspective view and includes four equally-spaced liner tabs 502. In this combustion system, due to the configuration of the fuel-air mixing and combustion, the liner tabs 502 were subjected to high operating temperatures and high thermal stresses since the liner tabs 502 were located radially outward of the combustion zone. The liner tabs 502 are shown in greater detail in FIG. 6. The liner tab 502 has a general pitch-fork like shape to it, including an inverted generally U-shaped portion 504 and tab extension 506. The generally U-shaped portion 504 is welded to the combustion liner 500 along joints 508. This prior art design attempted to remove the thick liner tab portions from the combustion liner, as discussed above with respect to FIGS. 1-4. However, despite these design changes, the joints 508 experienced some of the highest operating stresses in the combustion liner 500. Such high stresses were due at least in part to the stiffness of the liner tabs 502.

Therefore, it is necessary to identify a design alternative that meets the mechanical and thermal loading conditions of the combustion liner and flow sleeve interface such that the combustion liner can be secured in its proper position and not be subjected to failure.

SUMMARY

The present invention discloses a combustion liner having an improved means for securing the combustion liner within the gas turbine combustor. The securing means disclosed herein results in lower operating stresses and increased durability for the combustion liner.

In an embodiment of the present invention, a generally cylindrical combustion liner is disclosed having an inner wall, an outer wall, an inlet end and an opposing outlet end as well as a plurality of support tab assemblies positioned about the outer wall. Each of the support tab assemblies include two parallel liner tabs extending radially outward from the outer wall of the combustion liner.

In an alternate embodiment of the present invention, a support system for securing a combustion liner in a gas turbine combustor is disclosed. The support system comprises a plurality of liner tab pairings extending radially outward from the outer wall of the combustion liner. The liner tabs are secured to the liner outer wall and spaced apart by a liner tab as well as position a distance axially from the combustion liner inlet such that the liner tabs are radially outward of the combustion zone in the combustion liner.

In yet another embodiment of the present invention, a method of reducing the thermal stresses at an interface between the combustion liner and its liner support assembly is disclosed. The method provides a way of securing a plurality of liner support assemblies to an outer wall of the combustion liner, where each liner support assembly comprises two parallel liner tabs extending radially outward from the combustion liner and spaced a distance apart.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

By way of reference, this application incorporates the subject matter of U.S. Pat. Nos. 6,935,116, 6,986,254, 7,137,256, 7,237,384, 7,513,115, 7,677,025, and 7,308,793.

Figure 1:
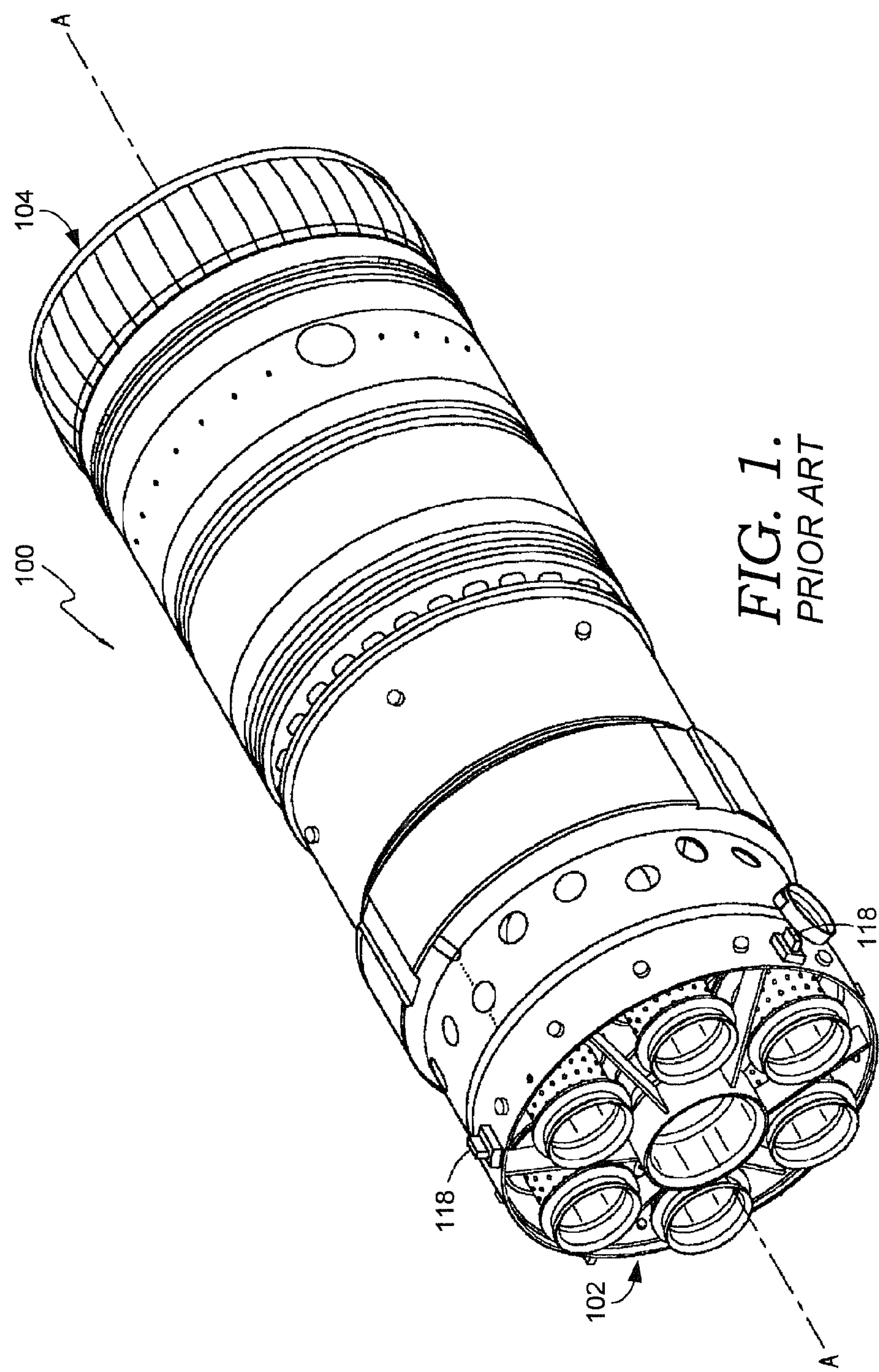
FIG. 1 is a perspective view of a combustion liner in accordance with the prior art.
Figure 2:
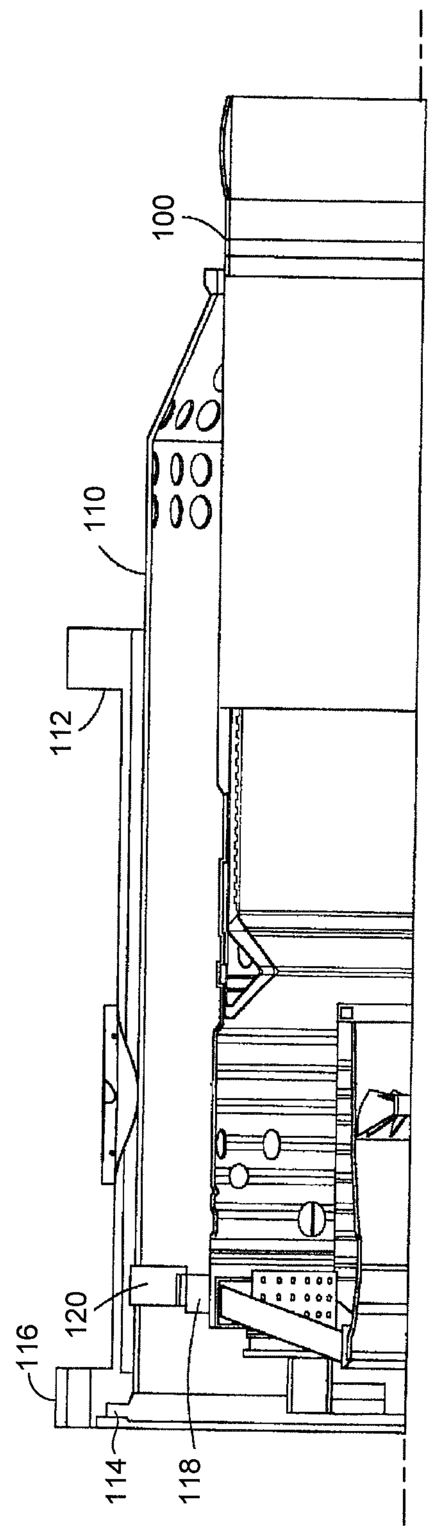
FIG. 2 is a partial cross section view of a gas turbine combustor of the prior art.
Figure 3:
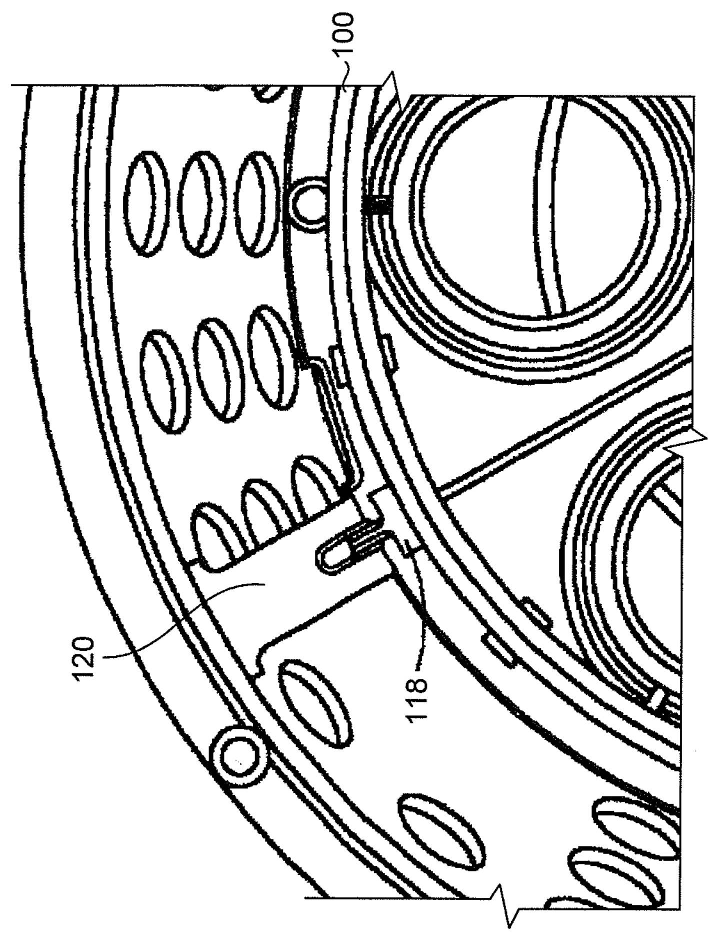
FIG. 3 is an alternate view of the gas turbine combustor of FIG. 2 of the prior art.
Figure 4:
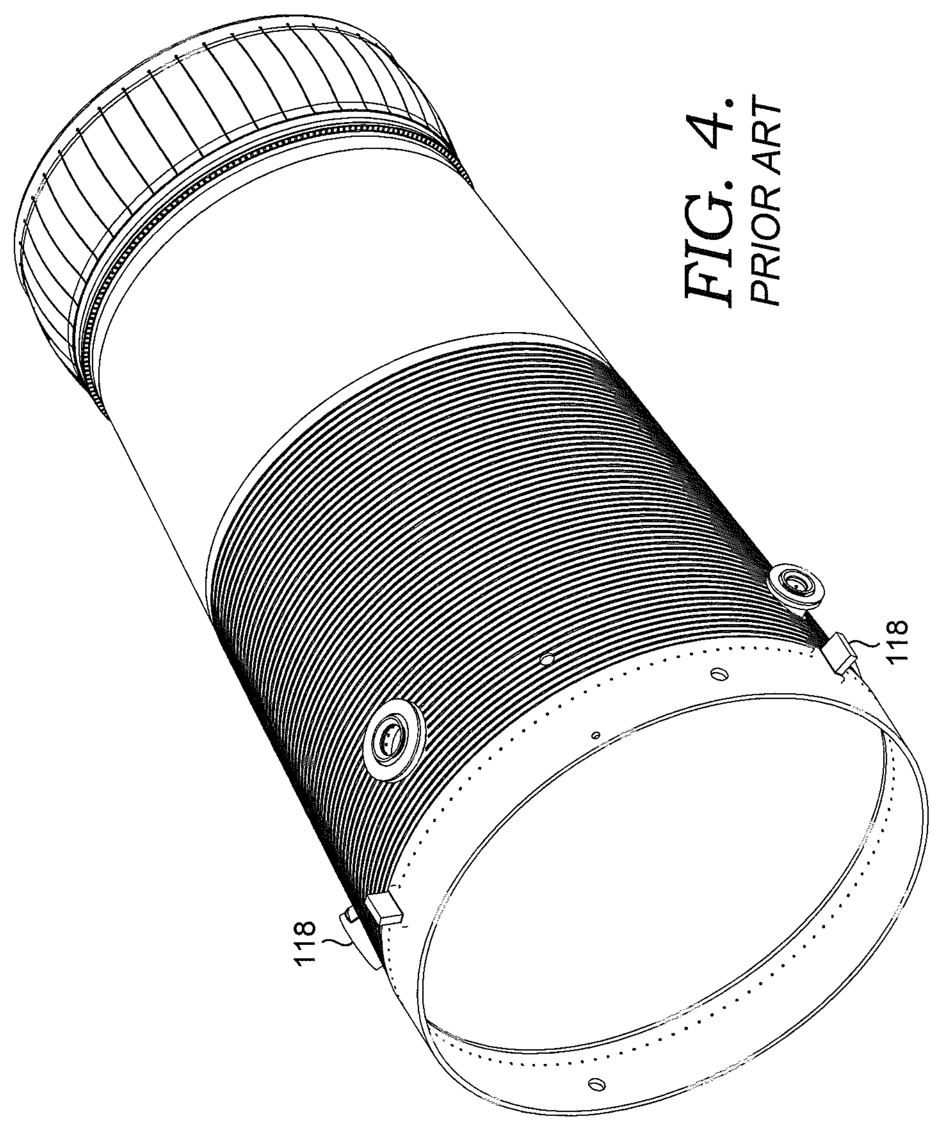
FIG. 4 a perspective view of a combustion liner in accordance with an alternate embodiment of the prior art.
Figures 5, 6:
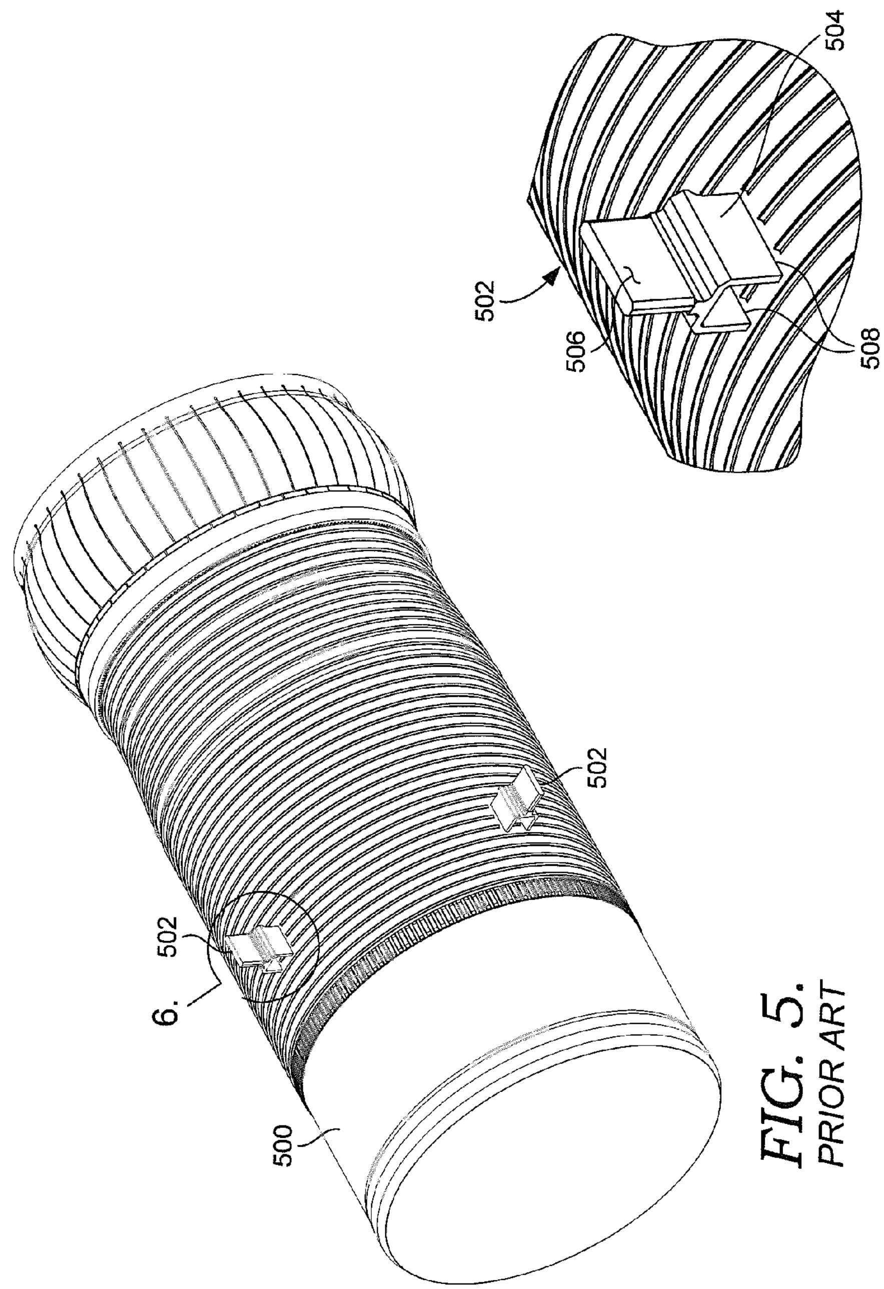
FIG. 5 is a perspective view of a combustion liner in accordance with yet another alternate embodiment of the prior art.
FIG. 6 is a detailed perspective view of a portion of the prior art combustion liner of FIG. 5.
Figure 7:
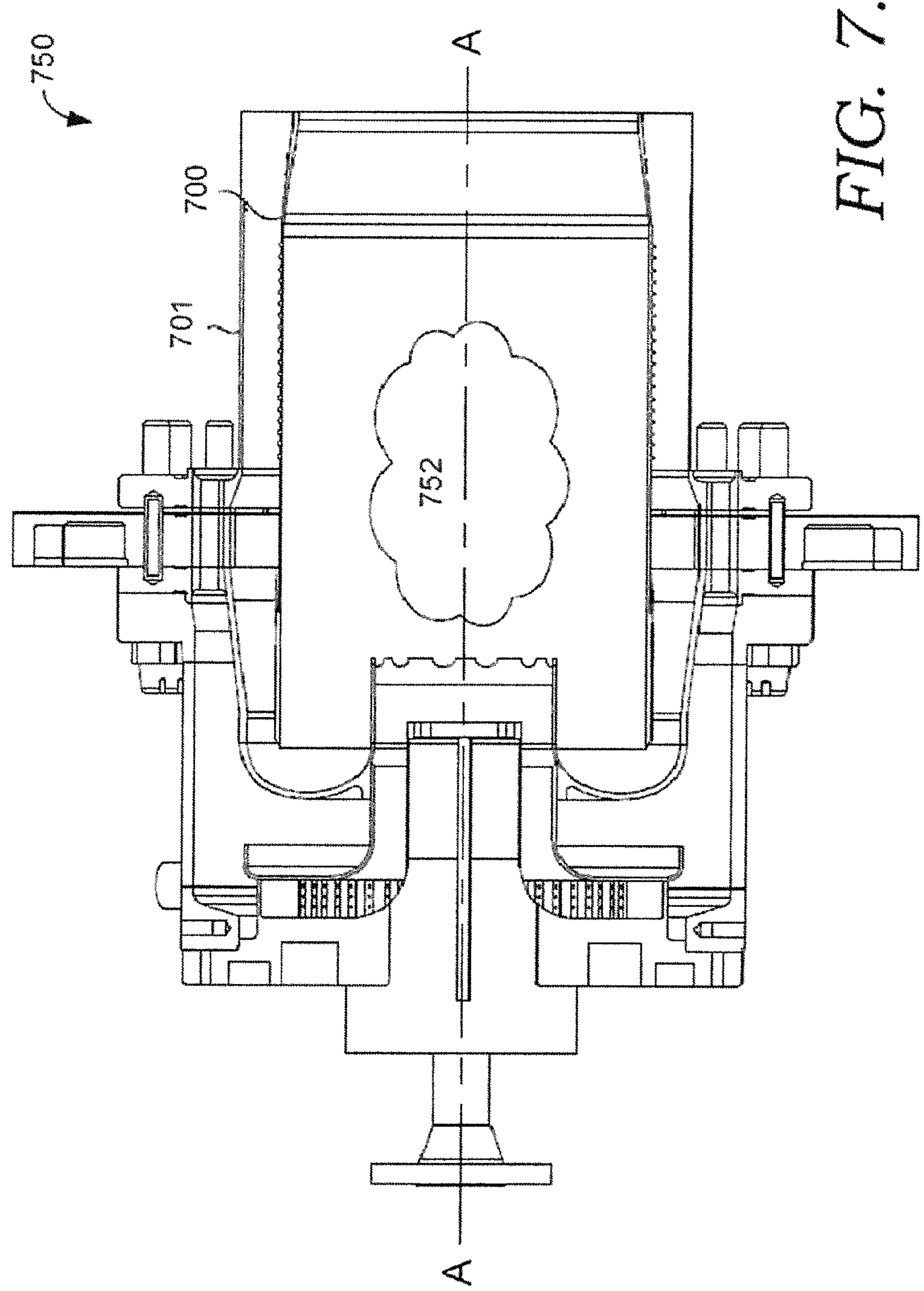
FIG. 7 is a cross section view of a low emissions gas turbine combustor in which an embodiment of the present invention is utilized.
Figure 10:
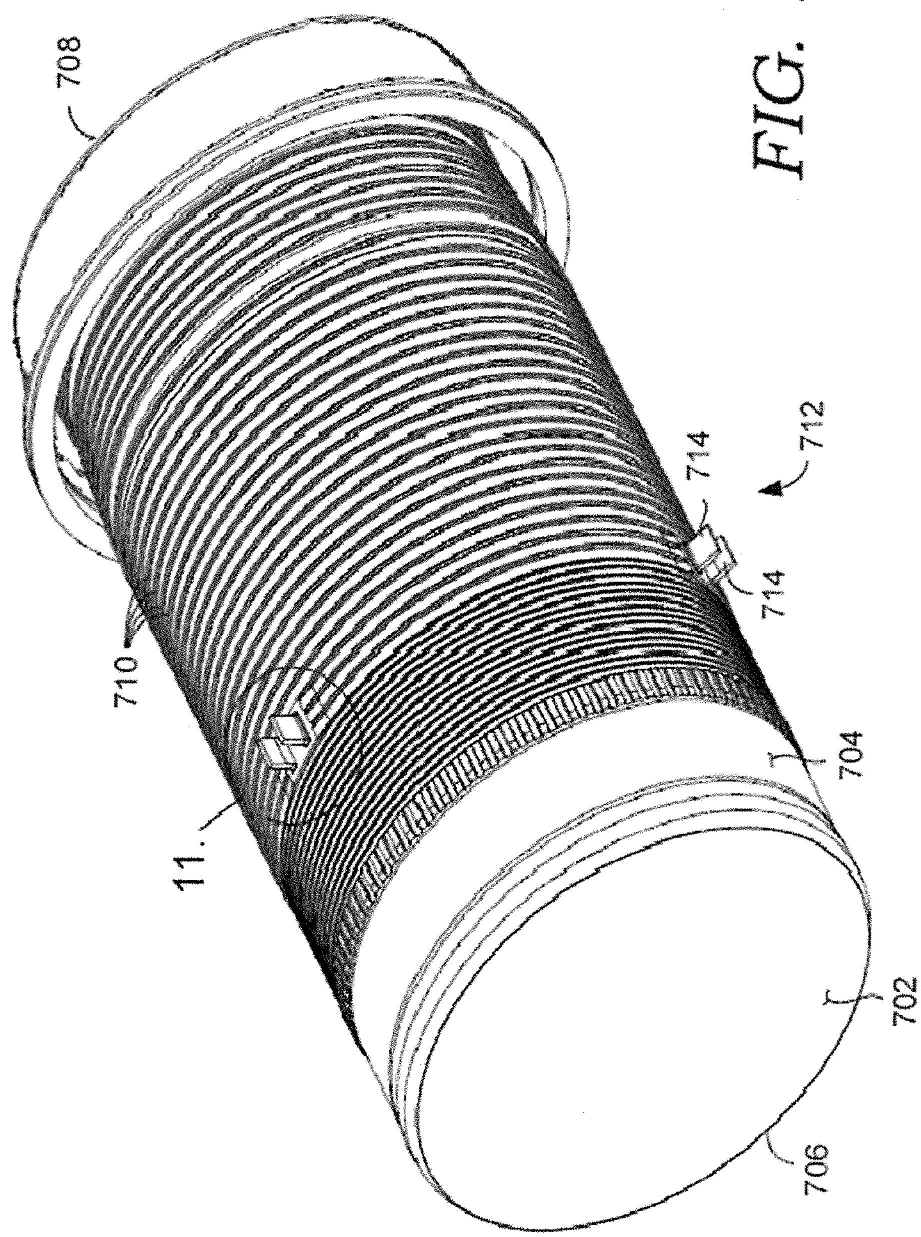
FIG. 10 is a perspective view of a combustion liner in accordance with an embodiment of the present invention.

The preferred embodiment of the present invention will now be described in detail with specific reference to FIGS. 7-12. Referring now to FIG. 7, a combustion liner 700 for use in a low emissions gas turbine combustor 750 is depicted. Referring to FIG. 10, the combustion liner 700 is generally cylindrical in shape and has an inner wall 702, an outer wall 704 separated from the inner wall 702 by a liner wall thickness. To compensate for elevated operating temperatures of the combustion liner, a portion of the inner wall 702 can be coated with a thermal barrier coating generally comprising a bond coating and a ceramic top coating.

Figure 12:
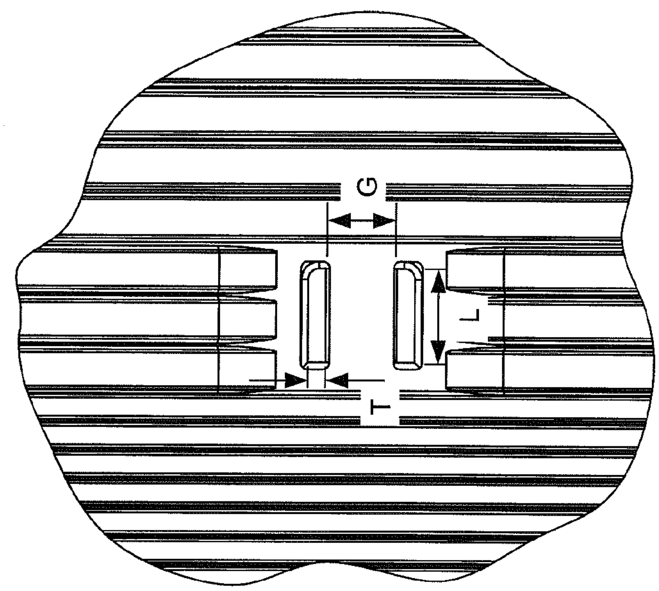
FIG. 12 is a detailed top elevation view of a portion of the combustion liner of FIG. 10 in accordance with an embodiment of the present invention.
Figure 11:
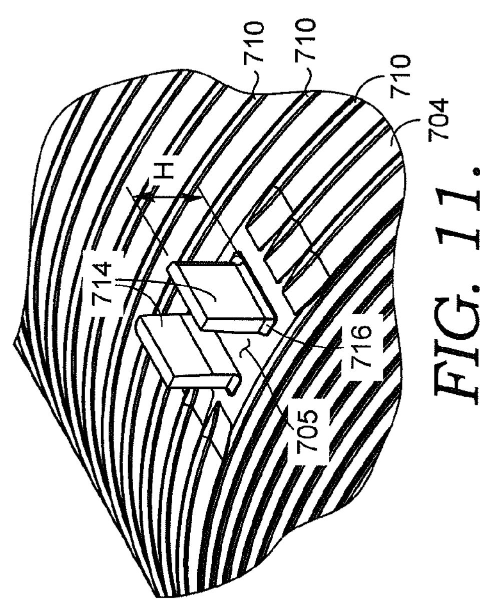
FIG. 11 is a detailed perspective view of a portion of the combustion liner of FIG. 10 in accordance with an embodiment of the present invention.

The combustion liner 700 also has an inlet end 706 and an opposing outlet end 708. Located along the outer wall 704 of the combustion liner, and extending radially outward, is a plurality of raised surfaces 710. The raised surfaces 710, which are more clearly shown in FIGS. 10-12, provide an increase in the total surface area of the outer wall 704 so as to enhance the available surface area of the combustion liner available to be cooled by the compressed air passing along the outer wall 704. An increase in the overall surface area capable of being cooled improves the heat transfer across the thickness of the combustion liner 700. As one skilled in the art understands, the raised surfaces 710 also serve to "trip" the passing airflow or disturb the airflow pattern in order to improve cooling effectiveness. The size and shape of the raised surfaces 710 can vary depending on the cooling requirements for the combustion liner 700. For the embodiment of the present invention shown in FIGS. 10-12, the raised surfaces 710 are generally triangular in shape such that the radially outermost point of the raised surface 710 has a diameter greater than the outer wall 704. However, the raised surfaces 710 can be of alternate shapes including circular, square or rectangular. The raised surfaces extend along a length of the combustion liner 700 requiring maximum cooling efficiency.

Figure 8:
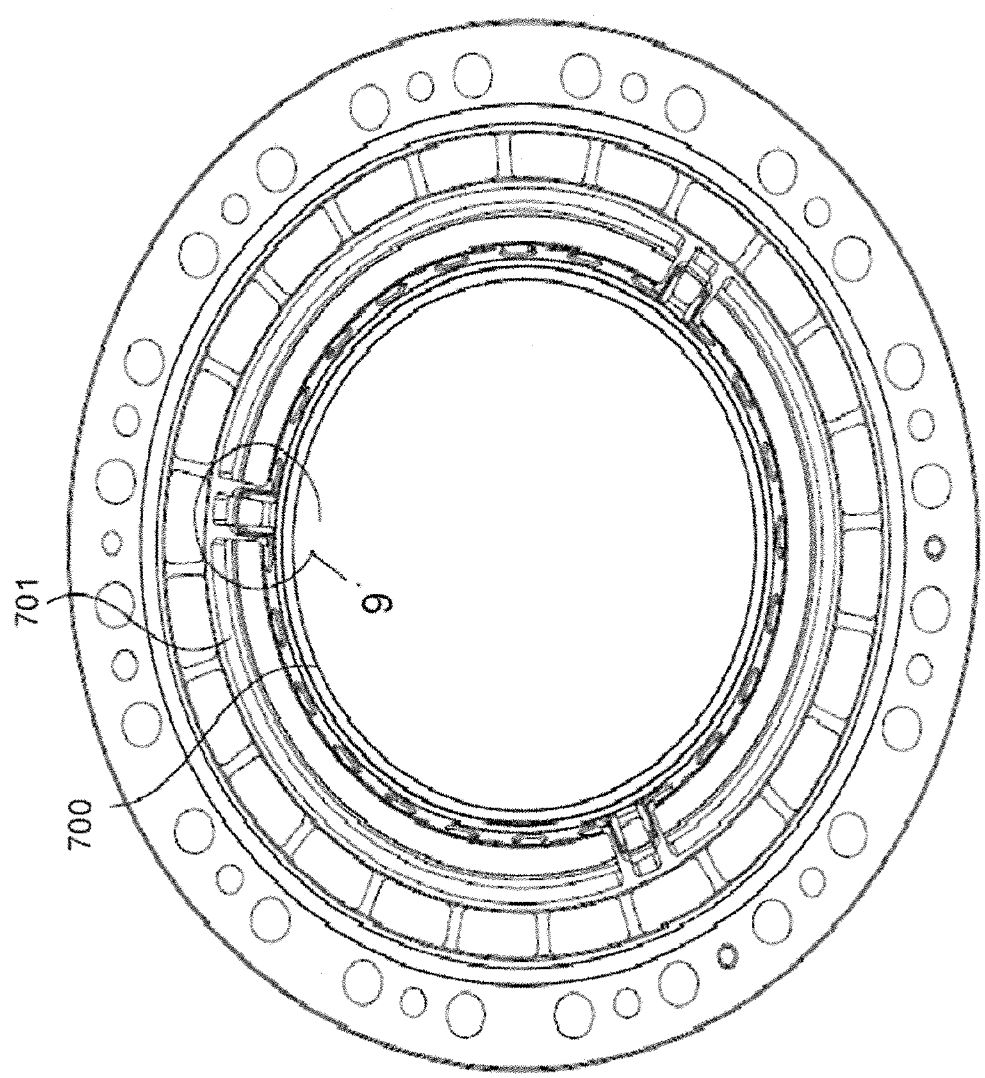
FIG. 8 is a cross section taken through the gas turbine combustor of FIG. 7 in accordance with an embodiment of the present invention.
Figure 9:
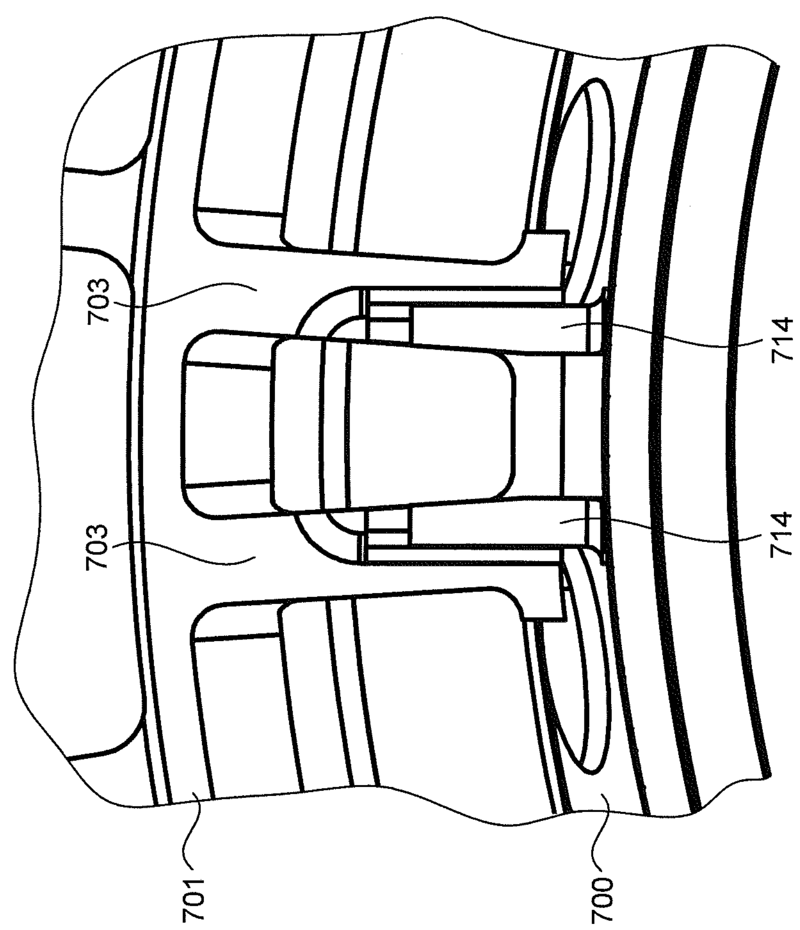
FIG. 9 is a detailed cross section view of a portion of FIG. 8 in accordance with an embodiment of the present invention.

The combustion liner 700 also comprises a plurality of support tab assemblies 712. The support tab assemblies 712, which are shown in more detail in FIG. 8, are positioned about the outer wall 704 of the combustion liner 700. Each of the support tab assemblies include two parallel liner tabs 714, spaced a tangential distance apart, secured to the outer wall 704 and extend radially outward from the outer wall 704. Preferably, three support tab assemblies 712 are spaced at approximately 120 degree intervals around the outer wall 704 of the combustion liner 700.

As depicted in FIG. 10, the plurality of raised surfaces 710 extends along a majority of the axial length of the combustion liner 700. However, as shown in FIGS. 11 and 12, in the area of the combustion liner 700 of the support tab assemblies 712, the plurality of raised surfaces is interrupted to create a smooth region 705 of the outer wall 704, or a region of the combustion liner outer wall that is free from the raised surfaces 710.

The combustion liner provides a location for the combustion process to occur. A combustion zone 752 is located within the combustion liner 700, thereby heating the surrounding portion of the combustion liner 700. Due to the geometry of the gas turbine combustor 750 it is necessary to locate the support tab assemblies 712 a distance axially downstream from the inlet end 706 such that the support tab assemblies 712 are radially outward of the combustion zone 752. As such, the support tab assemblies 712 are subjected to higher operating temperatures than liner tabs of the prior art. Therefore, because of their elevated operating temperatures, it is necessary to minimize any heat sink associated with support tab assemblies 712 or other structures capable of absorbing the heat, and resulting thermal stresses, from the combustion zone 752.

As discussed above, the support tab assemblies 712 comprise a pair of parallel liner tabs 714. The liner tabs 714 extend radially outward from the outer wall 704 of the combustion liner 700, where each of the liner tabs 714 have an axial length L, a radial height H, and a thickness T and are secured to the combustion liner. For the embodiment of the present invention depicted in FIGS. 10-12, the axial length L of the tab is greater than the radial height H and the height H is greater than the thickness T. The liner tabs 714 are secured to the outer wall 704 of the combustion liner 700 by a means such as welding and forming a full penetration weld joint 716. Since the liner tabs 714 are secured to the outer wall 704, it is preferred that the liner tabs 714 be fabricated from a material comparable to that of the combustion liner 700. In an alternate embodiment of the present invention, the liner tabs 714 and combustion liner 700 can have an alternate construction in which openings are cut in the combustion liner and the liner tabs extend through the openings and are then secured to the combustion liner. In yet another alternate embodiment, a machined plate with a liner tab can be welded into a pocket in the liner, such that the machined plate forms part of the liner wall, instead of resting on top of the liner wall as in the prior art of FIGS. 1-4. Alternate means of securing the liner tabs, such as brazing, can be used in lieu of welding.

The liner tabs 714 are generally parallel and spaced apart by a liner tab gap G. The specific gap may vary depending on the specific design requirements of the combustion liner and flow sleeve, but for the embodiment depicted in FIGS. 10-12, the gap G between liner tabs 714 is approximately 0.5 inches. By placing a gap G between the liner tabs 714, compressed air is permitted to flow between the liner tabs thereby providing cooling air to all sides of the liner tabs 714.

Referring back to FIGS. 8 and 9, the engagement of the combustion liner 700 in a flow sleeve 701 is shown. Each of the liner tabs 714 are located within slots formed in pegs 703 of the flow sleeve 701. The pegs 703 provide a fixed location in which the liner is installed and ensures proper axial positioning of the combustion liner 700 within the gas turbine combustor. Because the material of the flow sleeve is generally harder than the combustion liner tabs 714, the liner tabs tend to become worn. To prevent wear to the combustion liner tabs 714, the flow sleeve slots are coated with a wear coating that is softer than the liner tabs 714, such that any wear that does occur at this interface occurs to the wear coating.

As discussed above, each of the liner tabs 714 has an axial length, a radial height and a thickness. While the specific size and shape of the liner tab 714 will vary depending on the combustor design, it is important to note that the thickness T of the liner tabs 714 for the embodiment disclosed in FIGS. 7-12 is thinner than the single T-shaped liner tab of the prior art. Through various testing and analysis, it has been determined that the use of multiple, but thinner, liner tabs, provides an advantage over the prior art in terms of reduced thermal stresses due to disconnecting the adjacent tabs and the thinner liner tabs forming less of a heat sink and smaller thermal gradient. Furthermore, with the liner tabs 714 secured directly to the liner, they generate a minimal "footprint" on the combustion liner, compared to prior art designs, such as the T-shaped lug in FIGS. 1-4. More specifically, by only securing the liner tabs to the liner, and not a T-shaped plate, there is less material to absorb heat from the combustion liner. The present invention incorporates other stress-reducing design features such as chamfered edges, fillet radii, and improved flexibility to further reduce stresses. For example, utilizing the liner tab 714 of the present invention over the liner tab 402 has shown a reduction in maximum concentrated stress upwards of approximately 40%.

In addition to the flexibility and improved heat transfer capability, utilizing multiple liner tabs 714 provides a stronger combustion liner support because of the multiple contact points with the mating flow sleeve. Also, the multiple liner tabs 714 provides for a corresponding increase in wear surfaces when engaged with the flow sleeve peg 703. As one skilled in the art understands, when the liner tabs 714 are engaged in the flow sleeve and the combustor is operational, the combustion liner is subjected to high levels of vibrations. As such, the combustion liner tabs 714 vibrate within the flow sleeve pegs 703, typically resulting in wear to the liner tabs 714. Therefore, providing additional surfaces capable of sustaining the wear reduces any concentrated wear experienced by liner tabs of the prior art.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive. Alternative embodiments and required operations, such as machining of shroud faces other than the hardface surfaces and operation-induced wear of the hardfaces, will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A generally cylindrical combustion liner comprising:

an inner wall;

an outer wall separated from the inner wall by a liner wall thickness, wherein the outer wall comprises a plurality of raised surfaces extending radially outward from the outer wall, and wherein each of the plurality of raised surfaces has a thickness and a circumferential length;

an inlet end;

an outlet end opposite the inlet end;

a plurality of support tab assemblies positioned about the outer wall, each of the support tab assemblies including two parallel liner tabs coupled to and extending radially outward from the outer wall, wherein each of the two parallel liner tabs has an axial length and a thickness, the axial length being greater than the thickness, wherein each of the two parallel liner tabs includes a first radially extending edge axially spaced apart from a second radially extending edge, wherein the first radially extending edge and the second radially extending edge are substantially parallel and extend from the outer wall and terminate at an axially extending edge, wherein the axially extending edge extends between the first radially extending edge and the second radially extending edge and is substantially perpendicular to the first radially extending edge and the second radially extending edge, wherein the plurality of raised surfaces is interrupted to create a plurality of smooth regions of the outer wall, wherein the parallel liner tabs in a first of the plurality of support tab assemblies are separated by a first smooth region of the plurality of smooth regions of the outer wall, and wherein the first smooth region extends the axial length of the parallel liner tabs in the first of the support tab assemblies;

wherein each of the two parallel liner tabs is connected to the outer wall but disconnected from each other; and wherein the length of each of the two parallel liner tabs is substantially perpendicular to the circumferential length of each of the plurality of raised surfaces.

2. The combustion liner of claim 1, wherein each of the plurality of raised surfaces extends continuously about a circumference of the outer wall, except for a region on the combustion liner surrounding the plurality of support tab assemblies, wherein the region is free from the plurality of raised surfaces.

3. The combustion liner of claim 1, wherein the plurality of support tab assemblies are positioned radially outward of the combustion zone in the combustion liner.

4. The combustion liner of claim 1, wherein the wall further comprises a thermal barrier coating.

5. The combustion liner of claim 1, wherein the parallel liner tabs are welded or brazed to the outer wall.

6. The combustion liner of claim 1, wherein the plurality of support tab assemblies are fabricated from a material compatible with the combustion liner.

7. A support system for securing a combustion liner in a gas turbine combustor comprising:

a plurality of liner tab pairings extending radially outward from an outer wall of the combustion liner, each liner tab pairing of the plurality of liner tab pairings having a pair of liner tabs each having an axial length, a height, and a thickness, where each of the liner tabs of the pair of liner tabs are parallel to each other and secured to a combustion liner and spaced apart by a liner tab gap as well as spaced an axial distance from an opening of the combustion liner such that each of the plurality of liner tab pairings are located radially outward of a combustion zone in the combustion liner; and a plurality of raised surfaces extending radially outward from the outer wall of the combustion liner, wherein each of the plurality of raised surfaces comprises a thickness and a circumferential length, and wherein each of the plurality of raised surfaces extends continuously about a circumference of the combustion liner, except for a region on the combustion liner surrounding each of the plurality of liner tab pairings, wherein the region is free from the plurality of raised surfaces, wherein each of the liner tabs includes a first radially extending edge axially spaced apart from a second radially extending edge, wherein the first radially extending edge and the second radially extending edge are substantially parallel and extend from the outer wall and terminate at an axially extending edge, wherein the axially extending edge extends between the first radially extending edge and the second radially extending edge and is substantially perpendicular to the first radially extending edge and the second radially extending edge, wherein the plurality of raised surfaces is interrupted to create a plurality of smooth regions of the outer wall, wherein the liner tabs in a first of the plurality of liner tab pairings are separated by a first smooth region of the plurality of smooth regions of the outer wall, and wherein the first smooth region extends the axial length of the liner tabs in the first of the liner tab pairings, wherein each of the liner tabs of the pair of liner tabs is connected to the outer wall but disconnected from each other; and wherein the length of each of the liner tabs of the pair of liner tabs is substantially perpendicular to the circumferential length of each of the plurality of raised surfaces.

8. The support system of claim 7, wherein the liner tabs are fabricated from a material similar to that of the combustion liner.

9. The support system of claim 8, wherein the liner tabs are welded or brazed to the combustion liner.

10. The support system of claim 9, wherein the liner tabs are welded or brazed to portion of the combustion liner outer wall having a smooth surface.

11. The support assembly of claim 7, wherein the axial length of the liner tabs is greater than the height of the liner tabs and the height of the liner tabs is greater than the thickness of the liner tabs.

12. The support assembly of claim 7, wherein the liner tab gap between the liner tabs is approximately 0.5 inches.

13. A method of reducing of thermal stresses comprising:

providing a combustion liner having a plurality of raised surfaces extending radially outward from the combustion liner, wherein each of the plurality of raised surfaces comprises a thickness and a circumferential length;

securing a plurality of liner support assemblies to an outer wail of the combustion liner at equally spaced intervals, wherein each of the plurality of liner support assemblies comprises two parallel liner tabs, wherein each of the two parallel liner tabs comprises an axial length and a thickness, the axial length being greater than the thickness, and wherein the length of each of the two parallel liner tabs is substantially perpendicular to the circumferential length of the plurality of raised surfaces, and wherein each of the two parallel liner tabs includes a first radially extending edge axially spaced apart from a second radially extending edge, wherein the first radially extending edge and the second radially extending edge are substantially parallel and extend from the outer wall and terminate at an axially extending edge, wherein the axially extending edge extends between the first radially extending edge and the second radially extending edge and is substantially perpendicular to the first radially extending edge and the second radially extending edge, wherein the plurality of raised surfaces is interrupted to create a plurality of smooth regions of the outer wall, wherein the parallel liner tabs in a first of the plurality of liner support assemblies are separated by a first smooth region of the plurality of smooth regions of the outer wall, and wherein the first, smooth region extends the axial length of the liner tabs in the first of the liner tab pairings, and wherein each of the two parallel liner tabs is connected to the outer wall but disconnected from each other.

14. The method of claim 13, wherein the securing of the plurality of liner support assemblies occurs by welding or brazing a base of each of the parallel liner tabs to the outer wall of the combustion liner.

15. The method of claim 13, wherein the parallel liner tabs are positioned an axial distance along the outer wall of the combustion liner from an inlet end such that the parallel liner tabs are located radially outward of a combustion zone.

16. The method of claim 13, wherein each of the plurality of support assemblies are equally spaced at approximately 120 degree intervals about the outer wall of the combustion liner.

17. The method of claim 13, wherein cooling air passes along the outer wall of the combustor liner and between the parallel liner tabs.

* * * * *